Feb. 20, 1968  G. MECKLER  3,369,540
HEAT ABSORBING STRUCTURE FOR AN AIR CONDITIONING SYSTEM
Filed May 16, 1966  3 Sheets-Sheet 1
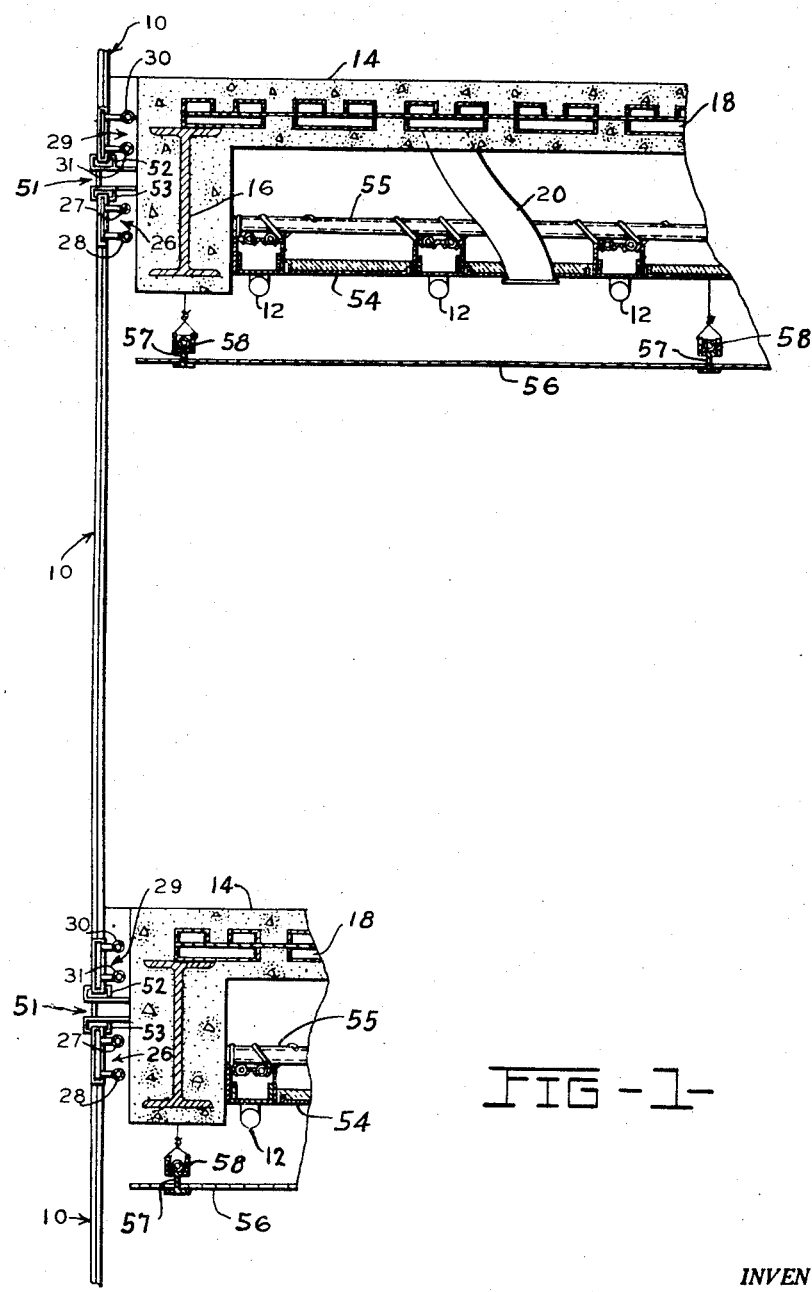
FIG-1-
INVENTOR.
GERSHON MECKLER
BY
Owen & Owen
ATT'YS.

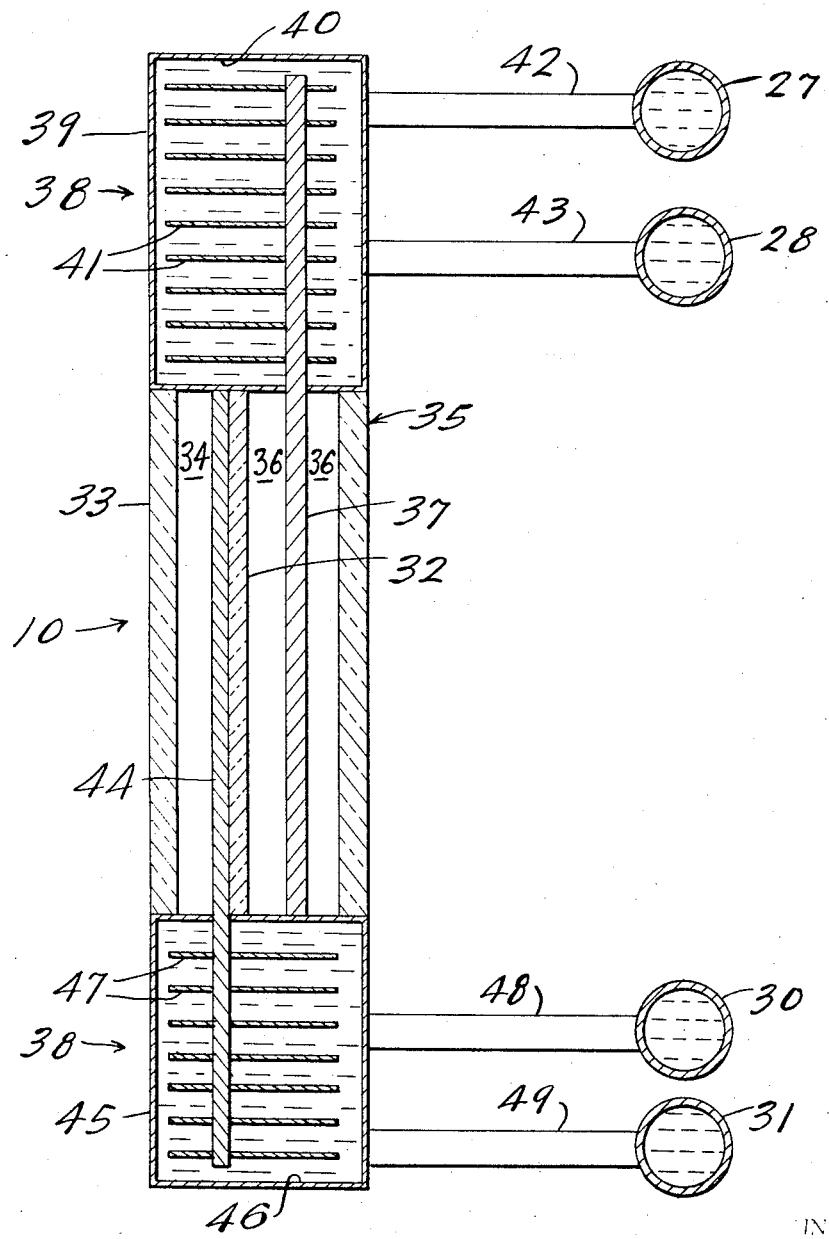

Feb. 20, 1968  G. MECKLER  3,369,540
HEAT ABSORBING STRUCTURE FOR AN AIR CONDITIONING SYSTEM
Filed May 16, 1966  3 Sheets-Sheet 3
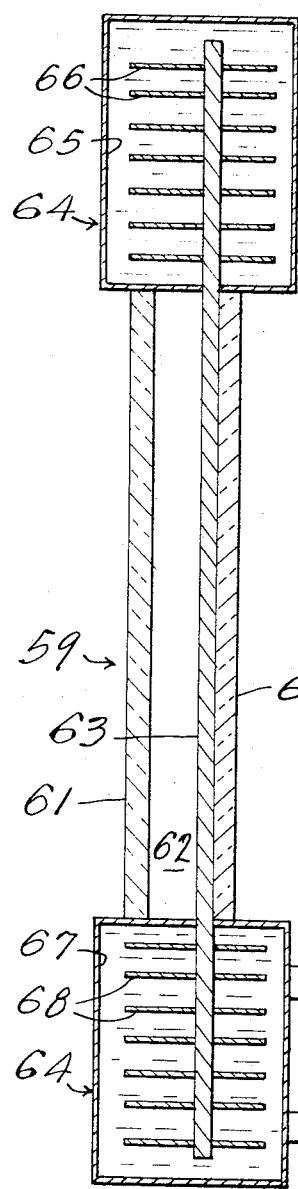
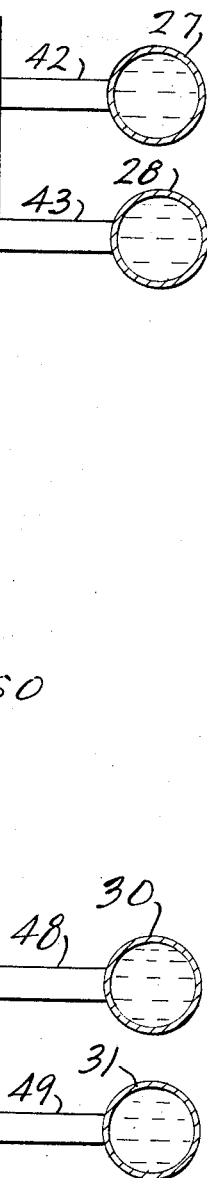
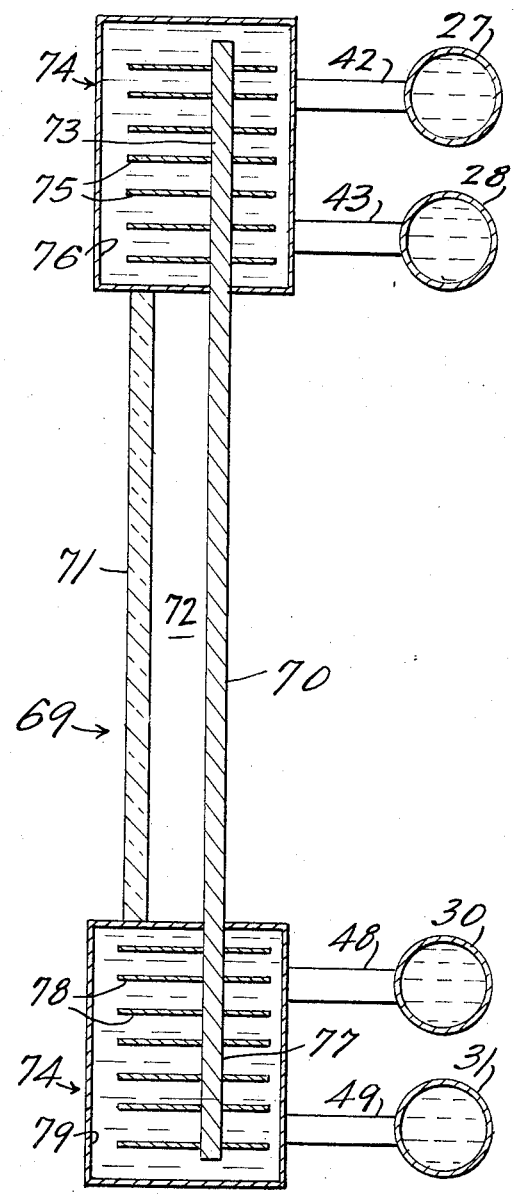
FIG-3-  FIG-4-
INVENTOR:
GERSHON MECKLER.
BY
Owen & Owen
ATT'YS.

United States Patent Office 3,369,540
Patented Feb. 20, 1968

3,369,540
HEAT ABSORBING STRUCTURE FOR AN
AIR CONDITIONING SYSTEM
Gershon Meckler, Atlanta, Ga., assignor to Lithonia
Lighting, Inc., Conyers, Ga., a corporation of
Georgia
Continuation-in-part of application Ser. No. 476,236,
Aug. 2, 1965, which is a continuation-in-part of
applications Ser. No. 31,902, May 26, 1960, and
Ser. No. 140,416, Sept. 21, 1961. This application
May 16, 1966, Ser. No. 550,415
6 Claims. (Cl. 126—271)

This is a continuation-in-part of application Ser. No. 476,236 filed Aug. 2, 1965, now Patent No. 3,268,720, which is a continuation-in-part of application Ser. No. 31,902, filed May 26, 1960, now abandoned, and which is also a continuation-in-part of application Ser. No. 140,-416, filed Sept. 21, 1961.

The present invention relates to air conditioning the interior of buildings and the like and more particularly to the absorption and dissipation of undesirable heat which is introduced into buildings by natural light from the exterior thereof.

A considerable amount of heat in the form of radiant energy is present in natural light, both in the visible range and in the infrared and the ultraviolet ranges. The presence of this heat in natural light causes numerous problems in the heating and air conditioning of buildings. More particularly, when clear glass is used in building fenestrations, much of the heat is transmitted into the interior of the building. In an attempt to overcome this, heat-absorbing glass has been substituted for clear glass and certain combinations of heat-absorbing glass and clear glass have likewise been utilized. While some heat has been absorbed by the heat-absorbing glass, nevertheless, a substantial amount still has been transmitted into the interior of the building. The transmitted heat has constituted a severe problem for known air conditioning systems because it affects only a portion of the building at any given time, thereby causing a condition of imbalance within the building with certain portions requiring more heating or cooling than others. The problem is further complicated because different portions of the building are subjected to the solar heat load as the position of the sun changes relative to the building. Also, the absorption of some of the solar energy tends to increase the temperature of the glass and may, in some cases, elevate the temperature of the glass to an extent that the glass acts as a hot body from which heat energy is transferred into the interior of the building even after the glass ceases to be exposed to the solar energy. In addition, cracking of heat-absorbing glass panels has occurred, particularly in installations where a part of such a panel has been shaded while another part thereof has received direct sunlight.

The present invention is based upon the discovery of apparatus for preventing or minimizing the thermal load normally imposed upon the air conditioning system of a building due to external, natural light sources. In accordance with the invention, a multi-sheet light-transmitting structure has been effected which is capable of absorbing a substantial amount of solar energy which would otherwise pass therethrough and of dissipating this energy while minimizing the increased heat load in the building. The structure also prevents cracking of heat-absorbing panels used therein.

It is, therefore, a principal object of the invention to provide a light-transmitting panel structure for minimizing the thermal load normally imposed on a building air conditioning system as an incident to the lighting thereof by natural sources.

Other objects and advantages of the invention will be apparent from the following detailed description of preferred embodiments thereof, reference being made to the accompanying drawings, in which:

FIG. 1 is a view in vertical cross section of a building showing the relative positions within the building of heat-absorbing, light-transmitting panel structures in accordance with the present invention;

FIG. 2 is a greatly enlarged, fragmentary view in vertical cross section of the light-transmitting structure shown in FIG. 1;

FIG. 3 is a view similar to FIG. 2 of a slightly modified heat-absorbing, light-transmitting panel structure; and FIG. 4 is a view similar to FIG. 3 of another slightly modified panel structure.

Referring to FIG. 1 in particular, a typical lighting system is shown which embodies the features of the present invention when installed in an enclosed structure such as a building. More particularly, this lighting system includes a heat-absorbing, light-transmitting panel indicated at 10, through which natural light is transmitted to the interior of the building. The panel absorbs, from the transmitted light, heat in the visible range of the spectrum, in the ultraviolet range, and in the infrared range. The lighting system also includes a plurality of supplemental sources 12 of artificial light. These sources can be fluorescent units, for example, for selectively augmenting the transmitted natural light.

The building comprises a plurality of concrete and cellular decks 14 supported by beams 16. Passages 18 are formed in the decks 14 to conduct a fluid medium, such as air, for heating, cooling, or other air conditioning of the structure. This fluid may be conveyed to or from the various rooms within the structure through suitable flexible conduits, one of which is designated 20, and each of which is in communication with one of the passages 18.

The building also has a heat transfer system which includes a first stage 26 located near the ceiling of each level of the building and which comprises a supply pipe 27 as well as a return pipe 28 for conveying a heat transfer fluid, such as water, around the periphery of the building. The system also includes a second stage 29 located at the floor of each level of the structure. The second stage is substantially identical with the first in that it comprises a supply pipe 30 as well as a return pipe 31 for conveying heat transfer fluid. The temperature of the water in the first stage can be in the range of 65°–75° F. while the second stage can be somewhat warmer, e.g., having a temperature within the range of 85°–95° F.

According to the present invention, cooling means are provided for the light-transmitting panel 10 for removing heat that is absorbed, or would otherwise be transmitted, by the panel 10. Heat exchange means (not shown) connected to the building heat transfer system, including both the first stage 26 and the second stage 29, are provided for removing heat from the cooling means.

Referring to FIG. 2, the panel 10 comprises a plate 32 of heat-absorbing glass located substantially at the center of the panel. A transparent sheet 33 is separated from the heat-absorbing plate 32 by a space 34, and the transparent sheet 33, which may be of clear glass or the like, is on the outermost side of the panel 10 which faces outwardly from the building. A second transparent sheet 35, which can be similar to the sheet 33, is located on the innermost side of the panel 20 and faces the interior of the building. The sheet 35 is separated from the heat-absorbing plate 32 by an air space 36.

Cooling means in the form of a heat interceptor 37 is located in the inner space 36 between the heat-absorbing plate 32 and the transparent sheet 35 and serves to cool the transparent sheet 35 and, to a certain extent, the air space 36. The heat interceptor 37 comprises a plurality of extremely thin, narrow strips of a heat-conducting material such as copper. The strips are parallel to one another and preferably extend vertically, being spaced approximately twenty per foot.

Heat from the heat interceptor 37 is dissipated to heat exchange means within the building structure associated with the panel 10. Specifically, the panel 10 includes a frame 38 within a portion of which is housing 39 forming a chamber 40 into which upper end portions of the cooling strips 37 extend. The chamber 40 is located within that portion of the frame 38 which extends along the top of the panel 10 and preferably contains water or other heat-transfer fluid. Heat exchange between the cooling strips 37 and the fluid in the chamber 40 is aided by fins 41 which are positioned in the fluid and in thermal contact with the cooling strips 37. The chamber 40 is connected to the supply pipe 27 of the first stage 26 of the building heat transfer system by means of a fluid conduit 42. A spaced portion of the chamber 40 is connected to the return pipe 28 of the first stage 26 of the building heat transfer system by means of a similar conduit 43. The conduits 42 and 43 enable the heat transfer fluid to circulate continuously through the chamber 40.

A high temperature region formed by the heat-absorbing panel 32 between itself and the outer panel 33 is cooled similarly to the lower temperature region formed between the heat-absorbing panel 32 and the inner panel 35. For this purpose, thin metal strips 44, e.g., of film, are located in the higher temperature region and, specifically, on the outwardly-facing surface of the heat-absorbing plate 32. The strips can be formed, at least in part, by vapor deposition. The strips extend into a suitable housing 45 forming a chamber 46 located at the bottom of the panel 10, within the lower portion of the frame 38. The chamber 46 contains water or other heat transfer fluid for heat exchange with the strips 44. The heat exchange is aided by fins 47 which are in contact with the strips and with the fluid. The fluid for the chamber 46 is supplied by means of a supply conduit 48 connected to the supply pipe 30 and a return conduit 49 connected to the return pipe 31.

With the panel structure, the temperature of the outer air space 34 may reach 200° F. while the interior of the inner glass sheet 35 is maintained at 75° F. Heat transfer from the outer space 34 to the inner air space 36 is reduced by the heat-absorbing glass plate 32, heat being transferred to the strips 44 as well as to the strips 37 and dissipated in the chambers 40 and 46.

Referring again to FIG. 1, the panels 10 are secured to the building by means of suitable brackets 51, each of which comprises a lower support section 52 which supports the upper panel along the bottom portion of the frame 38. The bracket also includes a top support section 53 which engages the top portion of the frame 38 of the lower panel.

The artificial light sources 12 can also be associated with water-cooled integrated radiant panels 54 supported overhead by suitable channels 55. Below the light sources 12 are louvered panels 56 which are effective to absorb heat from the sources 12 and transfer this heat through hangers 57 to heat transfer pipes 58. Hence, with this overall system, heat from both natural and artificial light sources is intercepted to minimize the heat load in the building.

Referring now to FIG. 3, the panel structure shown is similar to that of FIG. 2 but, basically, does not include the inner sheet 35. In this instance, a panel structure designated 59 includes a plate 60 of heat-absorbing glass or the like near the center of the panel 59. A transparent sheet 61 is separated from the heat-absorbing plate 60 by an air space 62 and the transparent sheet 61, which may be of clear glass or the like, is on the outermost side of the panel 59 which faces outwardly from the building.

Cooling means is located between the heat-absorbing panel 60 and the transparent sheet 61. The cooling means is in the form of a metal member or plurality of strips 63 of heat-conducting material such as copper. The strips can be formed, at least in part, by vapor deposition or electro-deposition on the outer surface of the panel 60. The strips 63 extend beyond the upper and lower extremities of the panel 60, as shown.

A frame 64 surrounds the panel 60 and the outer sheet 61, the upper portion of the frame 64 forming a chamber 65 containing fins 66 with which the conducting strips 63 are in heat transfer relation. Suitable heat transfer fluid can be supplied to the chamber 65 by the conduits and pipes 27, 28, and 42, 43.

At the lower edge of the heat-absorbing panel 60, the conducting strips 63 again can extend beyond the lower edge and into the frame 64. At the lower edge portion of the panel, the frame 64 forms a chamber 67 in which are heat transfer fins 68 in thermal contact with the metal strips 63. Heat transfer fluid in this instance is supplied by the conduits and pipes 48, 49, and 30, 31. With this arrangement, heat is transferred from the panel 60 at a relatively high rate since the panel is in thermal contact with the cooling fins 66 and 68 at both the upper and lower portions of the panel.

Referring now to FIG. 4, a heat-absorbing panel structure 69 is similar to the panel structure 59 except in this embodiment, no separate cooling means are employed. Instead, a heat-absorbing panel 70 is used in combination with an outermost panel 71, with an air space 72 therebetween. However, in place of the metal strips 63, for example, the heat-absorbing panel 70 is simply larger with an end portion or extension 73 extending into an upper portion of a panel frame 74 and in heat relationship with fins 75 in a chamber 76 to provide direct heat transfer from the panel to fluid in the chamber. Similarly, at the lower edge of the panel 70 is an end portion or extension 77 which extends in heat transfer relation with fins 78 in a chamber 79 formed by a lower portion of the panel frame 74. Suitable seals are provided for the extensions 73 and 77 where they enter the chambers 76 and 79.

It will be appreciated that a primary function performed by a panel according to the invention is to intercept radiant heat energy from the sun (which would be transmitted through a transparent panel and into a space to be air conditioned), and to transfer the heat which results from the interception to a heat transfer fluid. By virtue of transfer of the heat to a heat transfer fluid, cracking of heat absorbing panels is prevented, as is the imposition of excessive solar loads on certain portions of an air conditioned building. The net effect of operation of a panel according to the invention when solar energy is incident thereon is an increase of the temperature of the heat transfer fluid circulated as described above, and as a consequence of the transfer of heat to the fluid. The heat transferred to the fluid can be treated as problem heat, or can be treated as an energy source. When the heat is treated as a problem, the fluid can merely be circulated for cooling by any suitable means. Since a relatively high temperature fluid is capable of performing the desired heat transfer function, the use of an evaporative cooler to perform the cooling function is peculiarly advantageous because of the economic advantage over refrigerating apparatus. When the heat in the circulated fluid is treated as an energy source, this can be to drive a suitable heat pump, as claimed in application Ser. No. 476,236, now Patent No. 3,268,720, or by circulating fluid heated by heat exchange with a given panel according to the invention or a given group of panels according to the invention for heat transfer with a different panel or series of panels according to the invention. The latter procedure is particularly advantageous under conditions of winter operation when there may be a substantial amount of heat available from panels on which sunlight is incident at a given time while a substantial amount of heat is required in other portions of the building where solar energy is not then incident upon the panels.

It will be apparent that various changes and modifications can be made from the details set forth herein and shown in the attached drawings without departing from the spirit and scope of the invention as defined in these appended claims. For example, while fins 41, 47, 66, 68, 75 and 78 are shown, and are desirable for maximum heat transfer, panel structures according to the invention which do not include such fins are sometimes economically preferable. Similarly, while specific temperatures hage been suggested for the circulated heat transfer fluid, these are only exemplary, as the optimum temperatures depend upon many factors, including the climate which is involved and many specific details of the particular air conditioning system with which panels according to the invention are used. Other changes and modifications will be apparent.

What I claim is:

1. A window structure comprising at least one light-transmitting panel, at least one panel which is an interceptor for radiant heat energy incident upon said panel but through which light is transmitted and which is substantially coextensive with said light transmitting panel, said interceptor panel having extensions thereon extending beyond an edge portion of said window structure and means enclosing said extensions for circulating a heat transfer liquid in heat exchange relationship with said extensions.

2. A window structure as claimed in claim 1, and including heat transfer means in thermal contact with both said extensions of said interceptor panel and circulated heat transfer liquid.

3. A window structure according to claim 2 wherein said heat transfer means comprises a heat-conducting member in heat transfer relation with said extensions of said interceptor panel and with said heat transfer liquid.

4. A window structure comprising at least one panel which is an interceptor for radiant heat energy incident upon said panel but through which light is transmitted, which panel has extensions thereon which extend into a frame in which said panel is mounted, said frame including a passage for circulation of a liquid heat transfer fluid in heat exchange relationship with said extensions.

5. A light transmitting panel comprising: a first layer of glass which receives light from a light source, a center layer of heat absorbing glass, a third layer of glass from which the light emerges, said center layer dividing said panel into a high temperature region between itself and said first layer of glass, and dividing said panel into a lower temperature region between itself and said third layer of glass, first cooling means for absorbing energy from said high temperature region at one temperature level, and for transferring the energy absorbed to a first heat-transfer liquid, and second cooling means for absorbing energy from said low temperature region at a lower temperature level, and for transferring the energy absorbed to a second heat-transfer liquid.

6. Apparatus as claimed in claim 5 wherein said first cooling means is a heat conductor in thermal contact with said center layer of glass, said first cooling means including a chamber for containing a fluid, and said conductor being thermally connected to a plurality of fins within said chamber.

References Cited
UNITED STATES PATENTS

| | | | |
|---|---|---|---|
| 1,467,005 | 9/1923 | Lawrence | 237—1 X |
| 1,957,279 | 5/1934 | Linke. | |
| 3,107,052 | 10/1963 | Garrison | 126—271 X |
| 3,192,575 | 7/1965 | Rosemau et al. | 126—200 X |
| 3,239,144 | 3/1966 | Lueder | 126—271 X |

CHARLES J. MYHRE, *Primary Examiner.*

UNITED STATES PATENT OFFICE
CERTIFICATE OF CORRECTION

Patent No. 3,369,540                      February 20, 1968

Gershon Meckler

It is hereby certified that error appears in the above numbered patent requiring correction and that the said Letters Patent should read as corrected below.

Column 1, line 18, after "1961" insert -- , now abandoned --; column 2, lines 11 and 12, for "modiged" read -- modified --; line 29, for "concerete" read -- concrete --; column 5, line 9, for "hage" read -- have --.

Signed and sealed this 6th day of May 1969.

(SEAL)
Attest:

Edward M. Fletcher, Jr.
Attesting Officer

Commissioner of Patents